Oct. 29, 1935.  V. W. KLIESRATH  2,019,139
VEHICLE
Filed Feb. 15, 1934  2 Sheets-Sheet 1
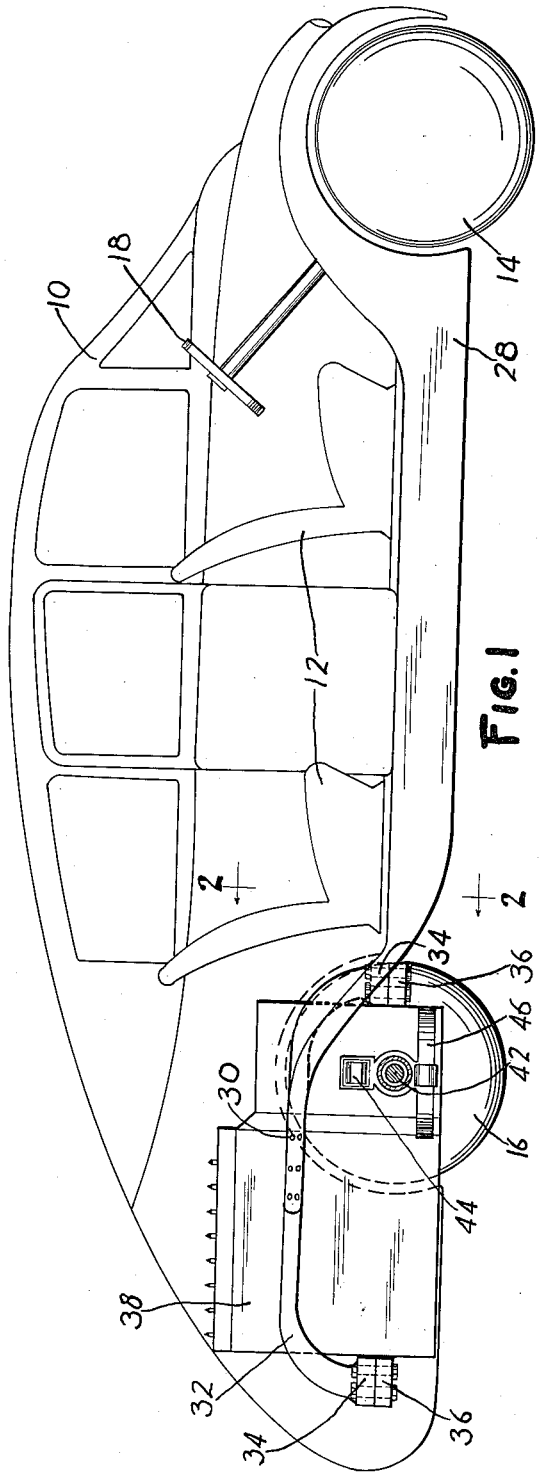
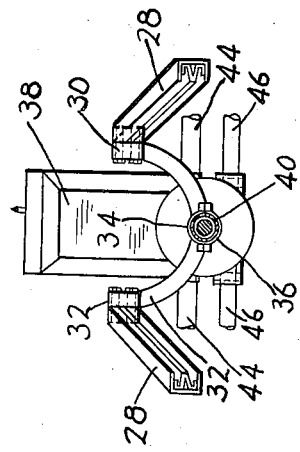
INVENTOR.
Victor W. Kliesrath
BY
ATTORNEY.

Oct. 29, 1935.     V. W. KLIESRATH     2,019,139
VEHICLE
Filed Feb. 15, 1934      2 Sheets-Sheet 2
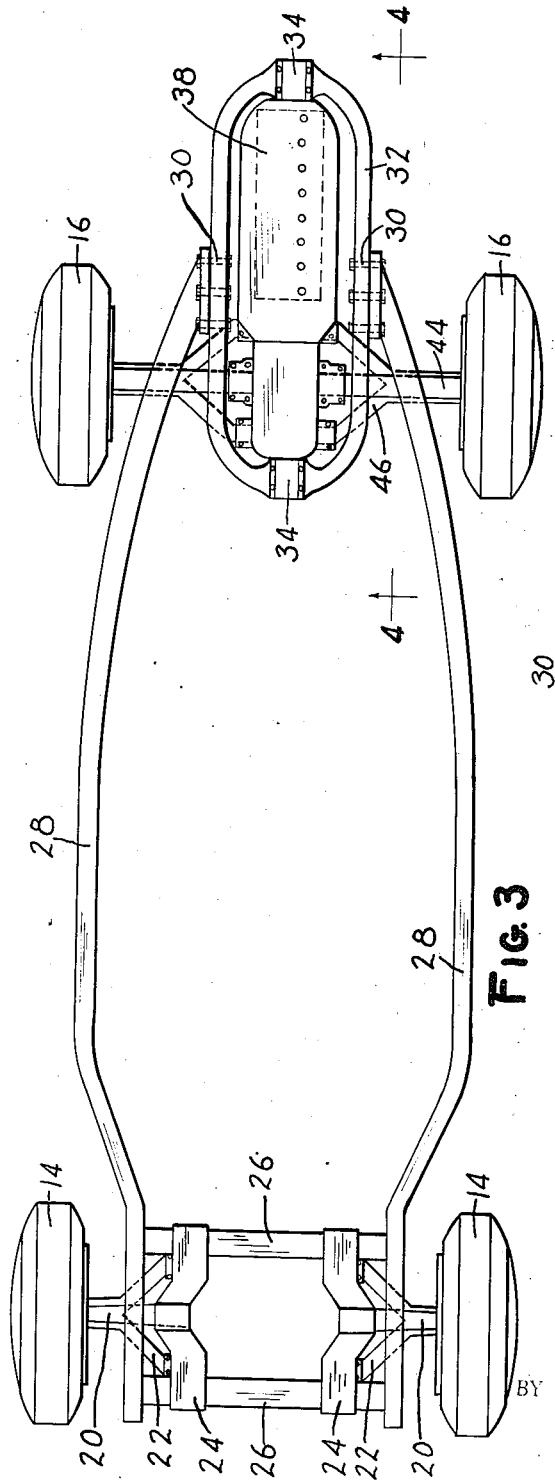
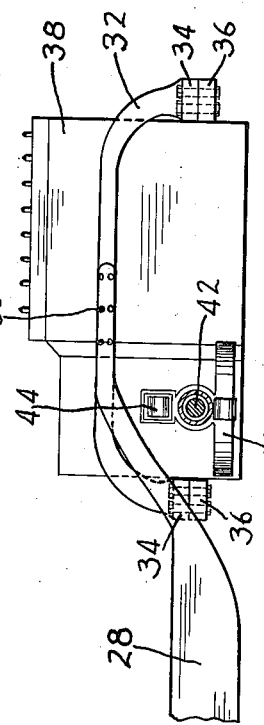
INVENTOR.
Victor W. Kliesrath
ATTORNEY.

Patented Oct. 29, 1935

2,019,139

UNITED STATES PATENT OFFICE 2,019,139

VEHICLE

Victor W. Kliesrath, South Bend, Ind., assignor to The Steel Wheel Corporation, Chicago, Ill., a corporation of New York Application February 15, 1934, Serial No. 711,340

12 Claims. (Cl. 180—54)

This invention relates to vehicles, and is illustrated as embodied in an automobile having individually-sprung wheels with the rear wheels driven by a power plant mounted at the rear of the vehicle between the driven wheels.

An object of the invention is to provide a strong but inexpensive support for the power plant, preferably in a manner permitting the power plant a slight movement so that the engine torque reaction may be transmitted directly to the wheels. In the illustrated arrangement the power plant carries, preferably yieldingly mounted thereon, axle sections or other means rotatably carrying the wheels, and one feature of the invention relates to forming and arranging the supporting frame, and the chassis side members, to afford ample clearance avoiding any possible interference with the axle means.

In one desirable arrangement, the chassis side members are deflected upwardly and toward each other at their ends, and the ends are rigidly secured to the sides of the above-described frame. The front and rear ends of the frame are shown deflected downwardly and provided with supports such as alined bearings in which the power plant is pivotally mounted. The sections or other axle means yieldingly carried by the power plant may thus be arranged to extend outwardly to the right and left underneath the sides of the frame and the ends of the chassis side members, to give the necessary freedom from possible interference.

The above and other objects and features of the invention, including various novel combinations of parts and desirable particular constructions, will be apparent from the following description of the illustrative embodiment shown in the accompanying drawings, in which:

Figure 1 is a longitudinal vertical section, just inside the near wheels, showing the interior of the car diagrammatically and showing the relation of the power plant to the car body;

Figure 2 is a partial section on the line 2—2 of Figure 1, showing the power plant and its supporting frame in front elevation;

Figure 3 is a top plan view of the chassis, with the body removed; and

Figure 4 is a partial section on the line 4—4 of Figure 3, showing the power plant and associated parts in side elevation.

The illustrated automobile includes a suitable body 10, having one or more seats 12, and supported on front and rear road wheels 14 and 16, the front wheels being controlled by a steering wheel or the like 18. The front wheels are rotatably mounted (as explained more fully in my application No. 671,048, filed May 15, 1933) on knuckles pivoted at the outer ends of upper and lower axle sections 20 and 22 yieldingly mounted by rubber blocks or the like in sockets carried by brackets 24.

The upper sections 20 are shown straight, and the lower sections 22 as having diverging arms seated in sockets adjacent the ends of the brackets 24. The brackets bridge across, and are rigidly secured at their ends to, parallel cross members 26. The cross members 26 are welded or otherwise secured to longitudinally extending chassis side members 28 forming part of the base of the body 10. As shown in Figure 2, the side members 28 may be made of great strength by welding together two channel-section members, one in the channel of the other.

According to an important feature of the present invention, the rear ends of the side members 28 are deflected upwardly and toward each other, and are rigidly secured by bolts or other fastening means 30 to the sides of a novel supporting frame 32 for the vehicle power plant.

The front and rear portions of the frame 32 are deflected downwardly and provided with alined supports or bearings 34 (shown with detachable bolted caps 36) for a power plant 38 pivotally mounted therein. The bearings 34 are shown provided with rubber bushings 40, compressed therein, or vulcanized or otherwise bonded externally to the bearing and internally to a boss on the end of the power plant; these bushings do not require lubrication and yield sufficiently to permit the desired movement of the power plant. Preferably the above-described bearings are coaxial with respect to the engine crankshaft of the power plant.

The power plant 38 includes in one unit an engine and a clutch and a transmission and a differential, arranged substantially as described in my application No. 651,821, filed January 14, 1933, and drives the rear wheels 16 through suitable housed live or driving axle shafts 42 arranged as described in that application.

Above and below the shafts 42 are arranged axle means such as upper and lower axle sections 44 and 46 having the wheels rotatably mounted on knuckles at their outer ends. The upper sections 44 are shown straight, the lower sections 46 are shown with diverging arms connected to the power plant at points spaced a considerable distance apart longitudinally of the chassis, to give stability against side sway, and against longitudinal and other thrusts.

The inner ends of the axle sections may be yieldingly mounted in rubber blocks seated in sockets in the sides of the casing of the power plant, as explained in detail in my applications Nos. 651,821 and 671,048 referred to above. It is not my intention to claim in this application any of the subject-matter of said prior applications, except as it may enter into the new combination described above.

By deflecting the ends of the side members 28 upwardly, and deflecting the bearing-supporting portions of frame 32 downwardly, the power plant is mounted in the desired position, while ample clearance is afforded to avoid any interference with the axle sections 44 and 46. These sections not only serve as the spring suspension for the rear end of the car; they also transmit directly to the wheels the torque reaction of the engine.

While one illustrative embodiment has been described in detail, it is not my intention to limit the scope of the invention to that particular embodiment, or otherwise than by the terms of the appended claims.

I claim:

1. A vehicle having a chassis provided with longitudinally-extending side members deflected upwardly at their rear ends, a frame supported at its sides upon said ends of the side members and having its front and rear portions deflected downwardly and provided with alined power plant supports, a power plant movably mounted at its front and rear ends upon said supports, axle means carried by said power plant and extending right and left under the sides of said frame and under the rear ends of said side members, and wheels rotatably mounted at the outer ends of said axle members.

2. A vehicle having a chassis provided with longitudinally-extending side members deflected upwardly at their rear ends, a frame supported at its sides upon said ends of the side members and having its front and rear portions deflected downwardly and provided with alined power plant supports, a power plant movably mounted at its front and rear ends upon said supports, upper and lower axle members carried by said power plant and extending right and left under the sides of said frame and under the rear ends of said side members, wheels rotatably mounted at the outer ends of said axle members, and driving means connecting the power plant with said wheels between the upper and lower ones of said axle members.

3. A vehicle having a chassis provided with longitudinally-extending side members deflected upwardly and toward each other at one end, a frame supported at its sides upon said ends of the side members, a power plant mounted at its front and rear ends upon said frame, and axle means carried by said power plant and extending right and left therefrom under said frame and under the ends of said side members and adapted rotatably to support right and left wheels.

4. A vehicle having a chassis provided with longitudinally-extending side members deflected upwardly and toward each other at one end, a frame rigidly secured at its sides to said ends of the side members, a power plant movably mounted at its front and rear ends upon said frame, and axle means yieldingly carried by said power plant and extending right and left therefrom under said frame and under the ends of said side members and adapted rotatably to support right and left wheels.

5. A vehicle having a chassis provided with longitudinally-extending side members deflected upwardly and toward each other at one end, a frame rigidly secured at its sides to said ends of the side members, supports carried by said frame out of the plane thereof and a power plant movably mounted at its front and rear ends upon said supports.

6. A vehicle having a chassis provided with longitudinally-extending side members deflected upwardly and toward each other at one end, a frame supported at its sides upon said ends of the side members, supports carried by said frame out of the plane thereof and a power plant pivotally mounted at its front and rear ends upon said supports.

7. A vehicle having a chassis provided with longitudinally-extending side members deflected toward each other at one end, a frame rigidly secured at its sides to said ends of the side members and having alined front and rear power plant supports, a power plant movably mounted on said supports, and axle means carried by the power plant and projecting right and left therefrom in a different horizontal plane from said frame to permit movement of the axle means relatively to the frame without interference.

8. A vehicle having a chassis provided with longitudinally-extending side members deflected toward each other at one end, a frame rigidly secured at its sides to said ends of the side members and having alined front and rear power plant bearings, a power plant pivotally mounted on said bearings, and axle means yieldingly secured to the power plant and projecting right and left therefrom in a different horizontal plane from said frame to permit movement of the axle means relatively to the frame without interference.

9. A vehicle chassis having side members having one end deflected upwardly and toward each other, and having rigidly secured to said ends at its sides a frame having its front and rear portions deflected downwardly and provided with alined supports for a power plant.

10. A vehicle chassis comprising side members and a frame secured to said side members adjacent one end thereof and having depending supports, a power plant mounted in said supports and axle means extending outwardly from the sides of said power plant under said frame.

11. A vehicle chassis comprising side members, and a frame secured thereto adjacent one end thereof, said frame having portions depending therefrom and supporting bearings, a power plant pivotally mounted in said bearings, and axle members extending outwardly from said power plant under said frame.

12. A vehicle chassis comprising side members having one end deflected upwardly, a frame rigidly secured to said ends and having its ends bent downward, and power plant supports carried by said frame ends substantially in the plane of said side members.

VICTOR W. KLIESRATH.